United States Patent
Kawasaki et al.

(10) Patent No.: US 12,188,594 B2
(45) Date of Patent: Jan. 7, 2025

(54) COUPLING FITTINGS AND COUPLING STRUCTURE

(71) Applicant: SAKURA RUBBER CO., LTD., Tokyo (JP)

(72) Inventors: Tetsuharu Kawasaki, Tokyo (JP); Kazuyuki Tamada, Tochigi (JP)

(73) Assignee: SAKURA RUBBER CO., LTD., Tokyo (JP)

( * ) Notice: Subject to any disclaimer, the term of this patent is extended or adjusted under 35 U.S.C. 154(b) by 0 days.

(21) Appl. No.: 18/297,100

(22) Filed: Apr. 7, 2023

(65) Prior Publication Data

US 2023/0243448 A1     Aug. 3, 2023

Related U.S. Application Data

(63) Continuation of application No. PCT/JP2021/036790, filed on Oct. 5, 2021.

(30) Foreign Application Priority Data

Oct. 9, 2020    (JP) ................................ 2020-171187

(51) Int. Cl.
*F16L 37/113*       (2006.01)
*F16J 15/10*       (2006.01)
(Continued)

(52) U.S. Cl.
CPC ........... *F16L 37/0847* (2013.01); *F16J 15/10* (2013.01); *F16L 37/113* (2013.01); *F16L 37/252* (2013.01)

(58) Field of Classification Search
CPC ... F16L 37/113; F16L 37/252; F16L 37/0847; F16L 37/24; F16J 15/10
See application file for complete search history.

(56) References Cited

U.S. PATENT DOCUMENTS 489,106 A * 1/1893 Storz ..................... F16L 37/252
                                                     285/379
764,018 A * 7/1904 Storz ..................... F16L 37/252
                                                     277/614
(Continued)

FOREIGN PATENT DOCUMENTS

CN          207921559 U      9/2018
FR            779532 A * 4/1935
(Continued)

OTHER PUBLICATIONS

Osafumi Ito, "Office Action for JP Application No. 2020-171187", Dec. 21, 2021, 5 pages, JPO, Japan.

*Primary Examiner* — Zachary T Dragicevich
*Assistant Examiner* — James A Linford
(74) *Attorney, Agent, or Firm* — Bridgeway IP Law Group, PLLC; Jihun Kim

(57) ABSTRACT

A coupling fitting comprises a cylindrical first body having a first end portion, a first coupling part having a plurality of first protrusions arranged around the first end portion and having hooks formed thereon, and a first seal material provided on an outer circumference of the first end portion. A gap is formed between the outer circumference and the plurality of first protrusions. When the coupling fitting is coupled with the target fitting, a part of the target fitting is inserted into the gap, the hooks of the plurality of first protrusions engage the target fitting, and the first seal material contacts an inner circumference of the target fitting.

9 Claims, 5 Drawing Sheets

(51) Int. Cl.
*F16L 37/084* (2006.01)
*F16L 37/252* (2006.01)

(56) References Cited

U.S. PATENT DOCUMENTS

| | | | | |
|---|---|---|---|---|
| 1,248,558 A | * | 12/1917 | Scribner | F16L 37/252 |
| | | | | 285/70 |
| 2,132,506 A | * | 10/1938 | Allen | F16L 37/252 |
| | | | | 285/73 |
| 7,798,537 B2 | * | 9/2010 | Nakamura | F16L 37/252 |
| | | | | 285/376 |
| 2017/0138520 A1 | | 5/2017 | Horimoto | |

FOREIGN PATENT DOCUMENTS

| | | |
|---|---|---|
| JP | S63-106990 U | 7/1988 |
| JP | H9-14533 A | 1/1997 |
| JP | 2002-039474 A | 2/2002 |
| JP | 2002-039475 A | 2/2002 |
| JP | 2007-333107 A | 12/2007 |
| JP | 2008-151307 A | 7/2008 |
| JP | 2016-031150 A | 3/2016 |
| WO | 99/20928 A1 | 4/1999 |
| WO | 03/074922 A1 | 9/2003 |
| WO | 2016/017652 A1 | 2/2016 |

* cited by examiner

COUPLING FITTINGS AND COUPLING STRUCTURE

CROSS-REFERENCE TO RELATED APPLICATIONS

This application is a Continuation Application of PCT Application No. PCT/JP2021/036790 filed Oct. 5, 2021 and based upon and claiming the benefit of priority from prior Japanese Patent Application No. 2020-171187, filed Oct. 9, 2020, the entire contents of all of which are incorporated herein by reference.

BACKGROUND OF THE INVENTION

1. Field of the Invention

The present invention relates generally to a coupling fitting and a coupling structure for coupling two channels.

2. Description of the Related Art

The applicant of the present application has developed, manufactured, and marketed a coupling fitting that can be coupled without distinction between male and female. As disclosed in Patent Literature 1 (JP 2016-31150 A), for example, this coupling fitting comprises a cylindrical body, a plurality of protrusions (fitting protrusions) arranged around the body, and a seal material such as a rubber packing provided at a distal end of the body. When the coupling fittings are coupled, seal materials of both fittings come in contact with each other as shown in FIG. 6A and FIG. 6B of the literature. These seal materials have a structure in which they are strongly pressed against each other when the pressure of transfer fluid increases. Therefore, fluid leakage is effectively suppressed.

As another example of a seal, Patent Literature 2 (JP 2007-333107 A) discloses in FIG. 1 a structure in which a portion with an enlarged inner diameter is formed at an end portion of the 5 body of one coupling fitting, and an O-ring is arranged on an outer circumference of an end portion of the body of the other coupling fitting.

In recent years, flood damage caused by heavy rains and typhoons has occurred frequently, and opportunities to use drainage pumps have increased. When connecting a hose at a drainage port side of a drainage pump, a coupling fitting with a structure as disclosed in Patent Literature 1 can be used. However, because of a negative pressure in the channel at a water suction port side of the drainage pump, if a coupling fitting of such a structure is used to connect the hose at the water suction port side, the seal material may not function sufficiently and air may be sucked in from the surrounding area.

With the sealing structure disclosed in Patent Literature 2, the seal material can function even if the pressure inside the channel is negative. However, since it is necessary to provide a special structure for both fittings, the versatility of the coupling fittings becomes poor.

Therefore, one of the objects of the present invention is to provide a coupling fitting and a coupling structure that can seal a coupling point of a channel well even if the pressure inside the channel is negative, and that has excellent versatility.

BRIEF SUMMARY OF THE INVENTION

A coupling fitting according to one embodiment comprises a cylindrical first body having a first end portion, a first coupling part having a plurality of first protrusions arranged around the first end portion and formed with hooks, and a first seal material provided on the outer circumference of the first end portion. A gap is formed between the outer circumference and the plurality of first protrusions. At the time of coupling the coupling fitting and a target fitting, a part of the target fitting is inserted into the gap, the hooks of the plurality of first protrusions engage the target fitting, and the first seal material contacts the inner circumference of the target fitting.

For example, the first body has an annular groove provided on the outer circumference, and the first seal material is a packing fitted into the annular groove. The first end portion may protrude more than the plurality of first protrusions in an axial direction of the first body. The first seal material may also face the plurality of first protrusions in a radial direction of the first body. The coupling fitting may further comprise a connection port to connect the first body to a water suction port of a pump.

A coupling structure according to one embodiment includes a first coupling fitting corresponding to the coupling fitting and a second coupling fitting. The second coupling fitting comprises: a cylindrical second body having a second end portion and a channel having a diameter larger than an outer diameter of the first end portion of the first body; a second coupling part having a plurality of second protrusions arranged around the second end portion and having hooks formed thereon; and a second seal material protruding more than a distal end surface of the second end portion in an axial direction of the second body. The gap between the outer circumference of the first end portion and the plurality of first protrusions is greater than a thickness of the second end portion. When the first coupling fitting is coupled with the second coupling fitting, the second end portion and the second seal material are inserted into the gap, the hooks of the plurality of first protrusions and the hooks of the plurality of second projections are engaged, and the first seal material contacts an inner circumference of the second body.

For example, a diameter of a channel of the first body is smaller than a diameter of a channel of the second body. The plurality of second protrusions may protrude more than the second end portion in the axial direction of the second body. No gap may be formed between an outer circumference of the second end portion and the plurality of second protrusions, or a gap smaller than the gap between the outer circumference of the first end portion and the plurality of first protrusions may be formed.

Preferably, the second coupling fitting can be coupled not only with the first coupling fitting but also with other coupling fittings having the same shape as the second coupling fitting.

According to the present invention, it is possible to provide a coupling fitting and a coupling structure comprising the coupling fitting that can seal a coupling point of a channel well even if the pressure inside of the channel is negative, and that has excellent versatility.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment will be described below with reference to the drawings.

A coupling structure and a coupling fitting according to the present embodiment can be used, for example, for coupling channels in drainage when flood damage occurs. In addition, the coupling structure and the coupling fitting according to the present embodiment can be used in various other situations, such as coupling of channels in firefighting fields, agricultural fields, or in factories.

Figure 1:
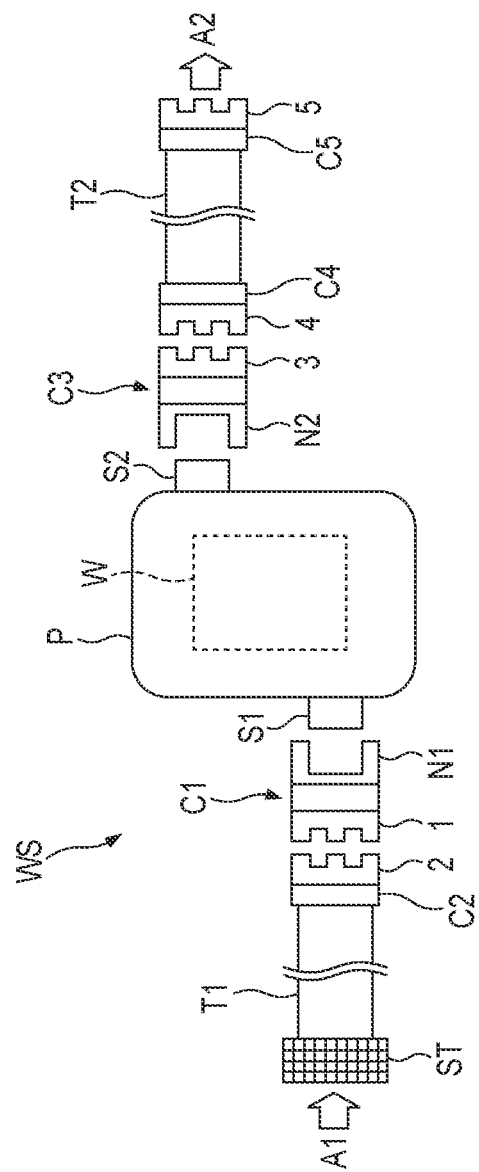
FIG. 1 shows a configuration example of a water supply system including a coupling fitting according to an embodiment.

FIG. 1 shows a configuration example of a water supply system WS that includes the coupling fittings according to the present embodiment. This water supply system WS comprises a pump P for drainage. The pump P comprises a water suction port S1, a drainage port S2, and a water supply mechanism W. The water supply mechanism W generates a flow of water (liquid) from the water suction port S1 to the drainage port S2.

The water supply system WS comprises a first coupling fitting C1 with a first coupling part 1 (water suction side medium) and a second coupling fitting C2 with a second coupling part 2 as elements arranged on the water suction port S1 side. The first coupling part 1 and the second coupling part 2 have, for example, the same shape and can be coupled to each other without distinction between male and female.

The first coupling fitting C1 further includes a connection port N1 that can be connected to the water suction port S1. For example, a male thread is formed on the outer circumference of the water suction port S1, and the connection port N1 has a female thread that can be connected to this male thread. However, the structure of the water suction port S1 and connection port N1 is not limited to this example.

The second coupling fitting C2 is provided at one end of a water suction pipe T1. A strainer ST is attached to the other end of the water suction pipe T1 to remove foreign matter from the water being sucked in.

The water supply system WS comprises a third coupling fitting C3 with a third coupling part 3 (drain side medium), a fourth coupling fitting C4 with a fourth coupling part 4, and a fifth coupling fitting C5 with a fifth coupling part 5 as elements arranged at the drainage port S2 side. The third coupling part 3, the fourth coupling part 4, and the fifth coupling part 5 have, for example, the same shape and can be connected to each other without distinction between male and female. The shapes of these coupling parts 3 to 5 may be the same as those of the first coupling part 1 and the second coupling part 2. Note that, in addition to the example shown in FIG. 1, the water supply system WS can be configured in various forms. For example, the water supply system WS may not include the fifth coupling fitting C5.

The third coupling fitting C3 further includes a connection port N2 that can be connected to the drainage port S2. For example, a male thread is formed on the outer circumference of the drainage port S2, and the connection port N2 has a female thread that can be connected to this male thread. However, the structure of the drainage port S2 and the connection port N2 is not limited to this example.

The fourth coupling fitting C4 is provided at one end of a water supply hose T2, and the fifth coupling fitting C5 is provided at the other end of the water supply hose T2. The water supply hose T2, for example, has a structure in which a liner is lined inside a jacket woven from warp and weft yarns.

When the water supply mechanism W is activated in a state where the water suction port S1 is connected to the water suction pipe T1 via the first coupling fitting C1 and the drainage port S2 is connected to the water supply hose T2 via the third coupling fitting C3, water is sucked in from the strainer ST side as shown by arrow A1, and this water is drained from the water supply hose T2 as shown by arrow A2.

For example, in a case where the third coupling fitting C3 and the fourth coupling fitting C4 are to be coupled, the fifth coupling fitting C5 may be coupled to a coupling fitting provided at an end portion of another water supply hose. This allows the channel on the drainage side to be extended.

Figure 2:
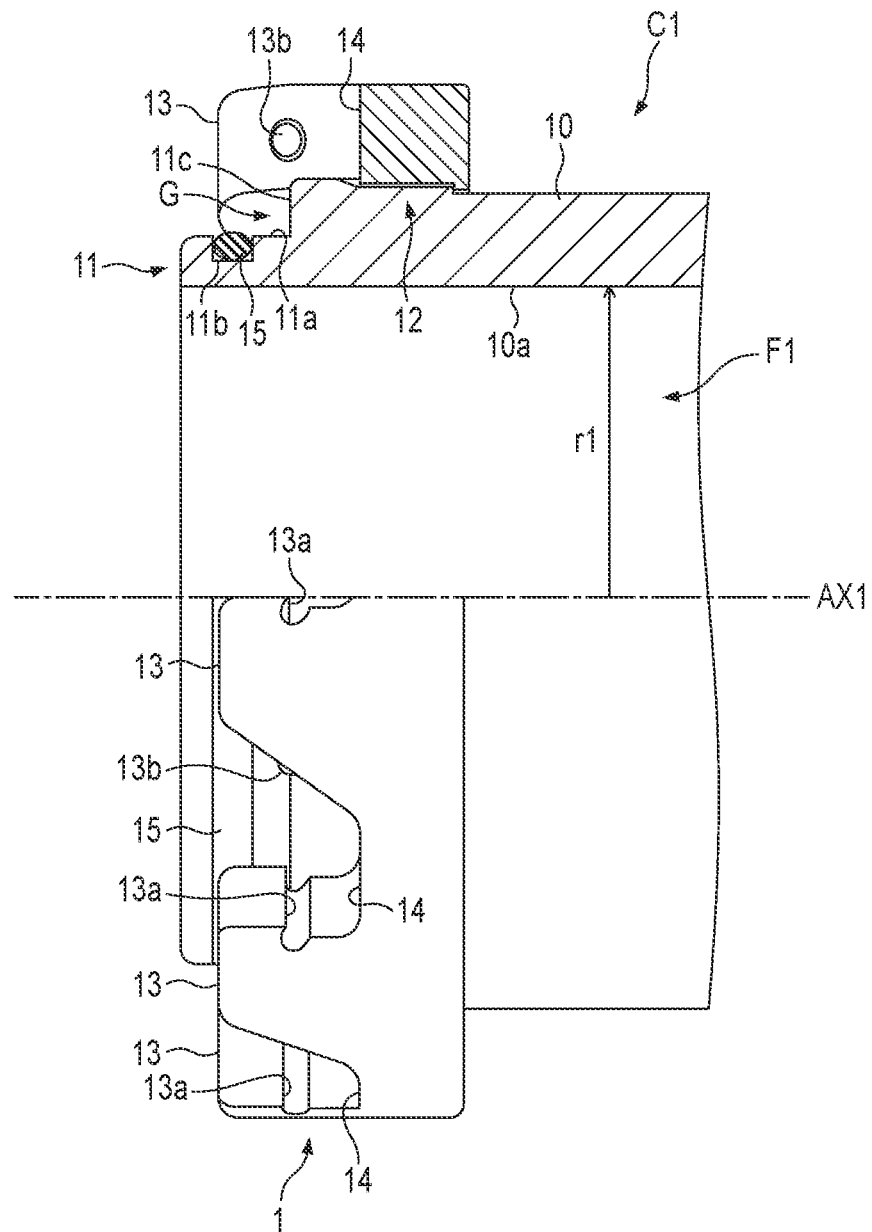
FIG. 2 is a schematic partial cross-sectional view of a first coupling fitting according to an embodiment.

FIG. 2 is a schematic partial cross-sectional view of the first coupling fitting C1. The first coupling fitting C1 comprises a cylindrical first body 10 made of metal. In the example of FIG. 2, the first body 10 includes a first channel F1 with a radius r1 centered on an axis AX1. The radius r1 corresponds to a distance from the axis AX1 to an inner circumference 10a of the first body 10. The shape of the first channel F1 in a plane perpendicular to the axis AX1 is uniform throughout the entire first body 10, for example.

The first body 10 includes a first end portion 11 in an axial direction parallel to the axis AX1. The first end portion 11 corresponds to a portion of the first body 10 with a reduced thickness (outer diameter) in FIG. 2. At any position in the circumferential direction around the axis AX1, the first end portion 11 has the cross-sectional shape shown in FIG. 2. The connection port N1 described above is provided at an end portion of the first body 10 on the opposite side of the first end portion 11. Through this connection port N1, the first body 10 is connected to the water suction port S1 of the pump P.

The first coupling part 1 is provided around the first end portion 11. The first coupling part 1 is an annular member made of metal, for example, and is attached to an engagement portion 12 provided on the outer circumference of the first body 10.

The first coupling part 1 includes a plurality of first protrusions 13 arranged around the first end portion 11. All of these first protrusions 13 have the same shape and are aligned at regular intervals in the circumferential direction. A first recess portion 14 is formed between adjacent first protrusions 13.

A hook 13a is formed on one side surface of the first protrusion 13 in the circumferential direction. In addition, a ball plunger 13b is provided on the other side surface of the first protrusion 13 in the circumferential direction. The ball plunger 13b includes a sphere that is mostly buried inside the first protrusion 13 and a biasing member that biases this sphere outward.

The first end portion 11 protrudes more than each of the first protrusions 13 in the axial direction. An annular groove 11b is formed on an outer circumference 11a of the first end portion 11 over its entire circumference. At the root of the first end portion 11, a wall surface 11c is formed parallel to the radial direction centered on the axis AX1.

A first seal material 15 is fitted in the groove 11b. The first seal material 15 is, for example, an annular packing (O-ring) made of rubber. The cross-sectional shape of the first seal material 15 is, for example, oval or circular as shown in FIG. 2, but may also be U-shaped or X-shaped.

A gap G is formed in a radial direction between the outer circumference 11a and each of the first protrusions 13. Most of the first seal material 15 is located within the groove 11b, while the remaining portion protrudes from the outer circumference 11a into the gap G. The first seal material 15 faces each of the first protrusions 13 in the radial direction.

Figure 3:
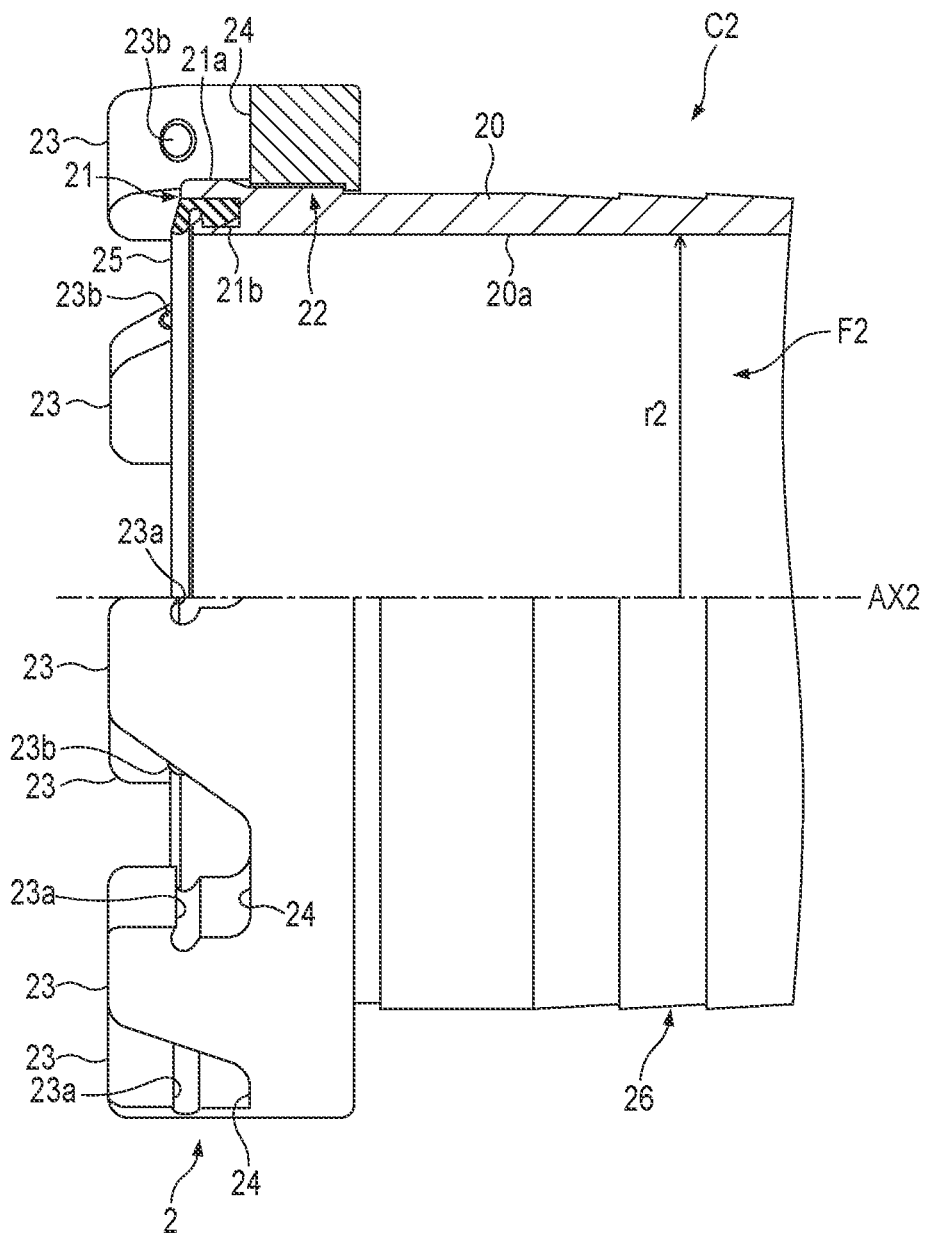
FIG. 3 is a schematic partial cross-sectional view of a second coupling fitting according to an embodiment.

FIG. 3 is a schematic partial cross-sectional view of the second coupling fitting C2. The second coupling fitting C2 comprises a cylindrical second body 20 made of metal. In the example of FIG. 3, the second body 20 includes a second channel F2 with a radius r2 centered on an axis AX2. The radius r2 corresponds to a distance from the axis AX2 to an inner circumference 20a of the second body 20. The radius r2 is larger than the radius r1 and the outer diameter of the first end portion 11 (radius of the outer circumference 11a) shown in FIG. 2. The shape of the second channel F2 in a plane perpendicular to the axis AX2 is uniform over the entire second body 20, for example.

The second body 20 includes a second end portion 21 in an axial direction parallel to the axis AX2. A second coupling part 2 is provided around the second end portion 21. The second coupling part 2 is an annular member made of metal, for example, and is attached to an engagement portion 22 provided on the outer circumference of the second body 20.

The second coupling part 2 includes a plurality of second protrusions 23 arranged around the second end portion 21. These second protrusions 23 are aligned at regular intervals in the circumferential direction around the axis AX2. A second recess portion 24 is formed between adjacent second protrusions 23.

A hook 23a is formed on one side surface of the second protrusion 23 in the circumferential direction. In addition, a ball plunger 23b is provided on the other side surface of the second protrusion 23 in the circumferential direction.

The shapes of the second protrusion 23, the hook 23a, the ball plunger 23b, and the second recess portion 24 are the same as those of the first protrusion 13, the hook 13a, the ball plunger 13b, and the first recess portion 14.

Each of the second protrusions 23 protrudes more than the second end portion 21 in the axial direction. An annular groove 21b is formed on a distal end surface of the second end portion 21 over its entire circumference. A second seal material 25 is fitted in the groove 21b. The second seal material 25 is made of rubber, for example, and protrudes from the distal end surface of the second end portion 21 in the axial direction.

For example, no gap is formed between an outer circumference 21a of the second end portion 21 and each of the second protrusions 23. However, a gap smaller than the gap G described above may be formed between the outer circumference 21a and each of the second protrusions 23.

The outer circumference of the second body 20 is provided with a mounting portion 26 configured by a plurality of steps aligned in the axial direction. The water suction pipe T1 described above is mounted on the mounting portion 26.

The same structure as that of the second coupling fitting C2 can be applied to a portion of the third coupling fitting C3 on the third coupling part 3 side, the fourth coupling fitting C4, and the fifth coupling fitting C5 described above.

Figure 4:
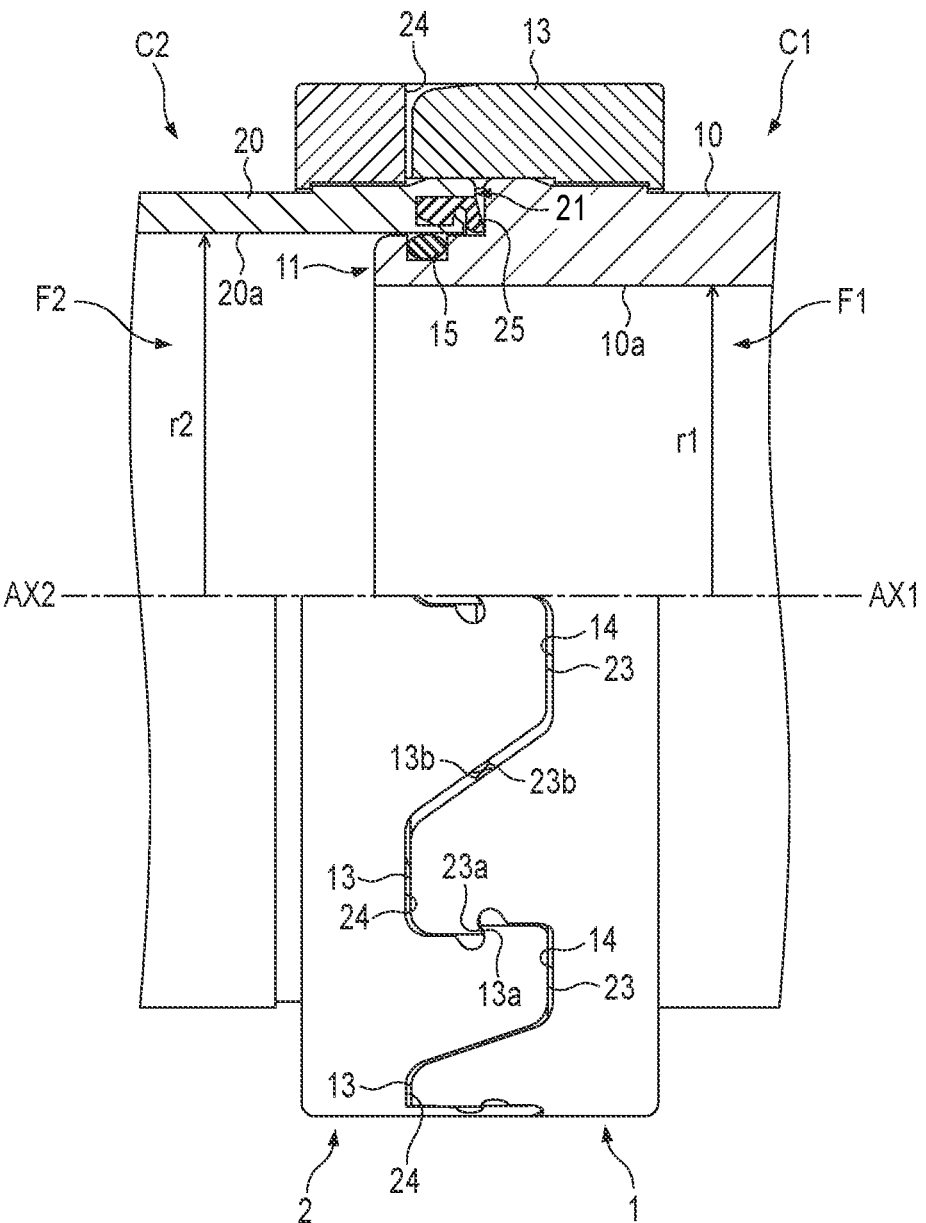
FIG. 4 is a schematic partial cross-sectional view of the coupled first and second coupling fittings.

FIG. 4 is a schematic partial cross-sectional view of the coupled first coupling fitting C1 and second coupling fitting C2. When coupling the first coupling fitting C1 and the second coupling fitting C2 (fittings to be coupled), the axes AX1 and AX2 are aligned, and the first protrusion 13 and the second recess portion 24 are pressed together in the axial direction in a state of facing to each other. As a result, the first protrusion 13 is inserted into the second recess portion 24 and the second protrusion 23 is inserted into the first recess portion 14, and the hooks 13a and 23a engage. Furthermore, the ball plungers 13b and 23b come in contact, and the circumferential force generated thereby maintains the engaged state of the hooks 13a and 23a.

Figure 5:
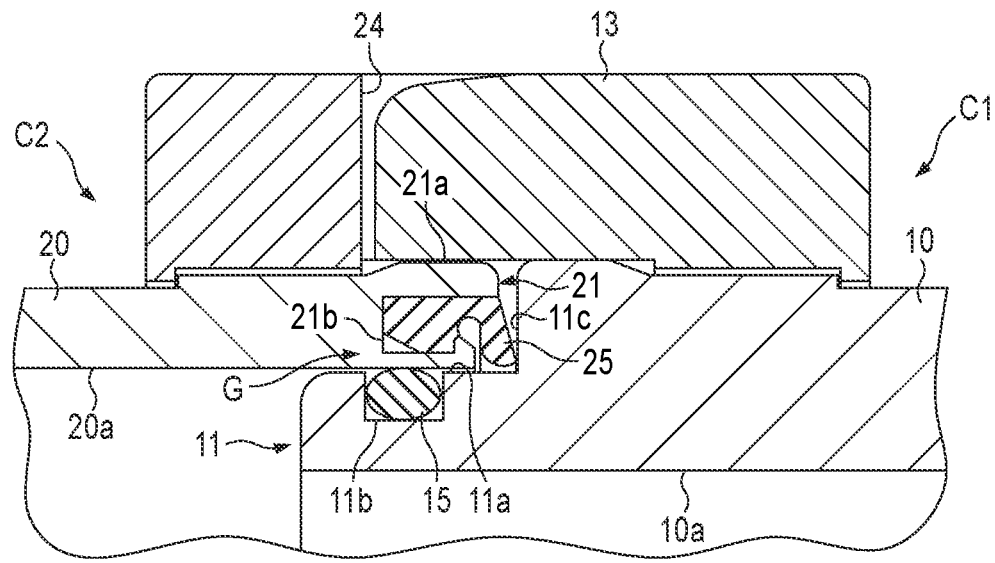
FIG. 5 is a schematic cross-sectional view of a part of the first and second coupling fittings shown in FIG. 4 in an enlarged manner.

FIG. 5 is a schematic cross-sectional view showing the first coupling fitting C1 and the second coupling fitting C2 shown in FIG. 4 in the vicinity of the first end portion 11 and the second end portion 21 in an enlarged manner. In the radial direction, the gap G between the outer circumference 11a of the first end portion 11 and the first protrusion 13 is larger than the thickness of the second end portion 21.

When the first coupling fitting C1 and the second coupling fitting C2 are coupled, the second end portion 21 and the second seal material 25 are inserted into the gap G. At this time, the first seal material 15 contacts the inner circumference 20a of the second body 20. In the example of FIG. 5, the second seal material 25 contacts the wall surface 11c of the first body 10. However, a gap may be formed between the second seal material 25 and the wall surface 11c at the time of coupling.

The first seal material 15 is further compressed in the radial direction by being pressed by the inner circumference 20a, compared to when the first coupling fitting C1 and the second coupling fitting C2 are not coupled. As a result, the first seal material 15 adheres to the inner circumference 20a and seals the gap between the outer circumference 11a and the inner circumference 20a.

The second coupling fitting C2 can be coupled not only with the first coupling fitting C1 but also with other coupling fittings having the same shape as itself.

Figure 6:
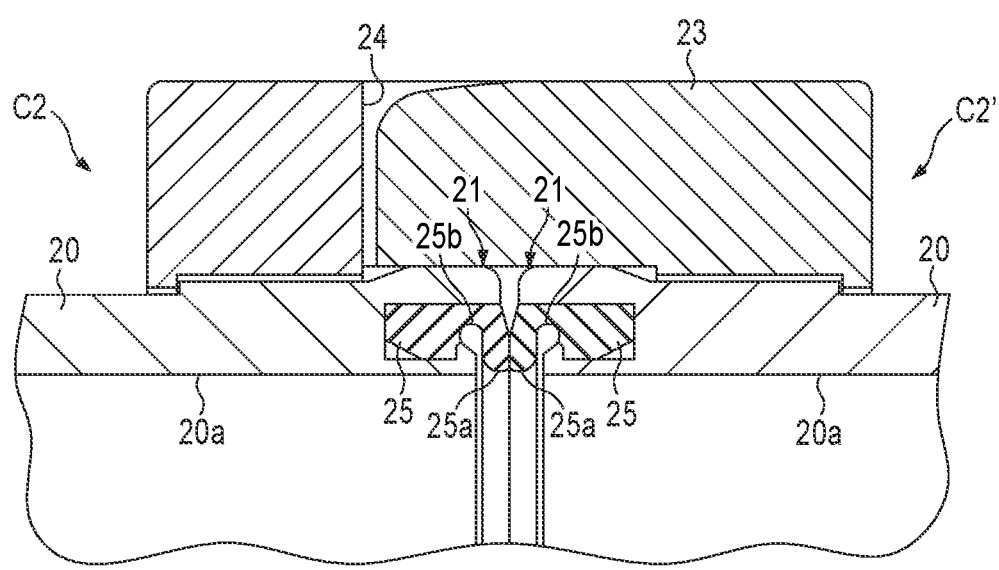
FIG. 6 is a cross-sectional view schematically showing a state in which the second coupling fitting is coupled with another coupling fitting of the same shape.

FIG. 6 shows a schematic cross-sectional view of a state in which the second coupling fitting C2 is coupled with another coupling fitting of the same shape. Here, the other coupling fitting is denoted by a symbol CT, and each part thereof is denoted by the same symbol as that of the second coupling fitting C2.

When the second coupling fitting C2 and the coupling fitting CT are coupled, the second protrusion 23 of one of these fittings is inserted into the second recess portion 24 of the other, respectively. At this time, as when coupling the first coupling fitting C1 and the second coupling fitting C2 shown in FIG. 4, the hook 23a of each second protrusion 23 engages and the ball plunger 23b of each second protrusion 23 comes in contact.

The second seal material 25 includes an annular lip 25a protruding from the second end portion 21 toward the inside of the second body 20 and an annular recess portion 25b formed near the root of this lip 25a. When the second coupling fitting C2 and the coupling fitting CT are coupled, the lip 25a of each second seal material 25 is pressed against each other in the axial direction.

When water of a pressure greater than atmospheric pressure (positive pressure) flows into the coupled second coupling fitting C2 and coupling fitting CT, a force in the direction of widening them acts on each recess portion 25b. As a result, each lip 25a is pressed against each other more firmly, thereby causing the boundary between the second bodies 20 of the second coupling fitting C2 and the coupling fitting CT to be sealed well.

Thus, for example, in a case where the coupling structure of the third coupling fitting C3 and the fourth coupling fitting C4 shown in FIG. 1 is similar to the example in FIG. 6, positive pressure water is delivered from the drainage port S2 of the pump P, and good sealing performance is achieved.

When water flowing inside in the coupling structure of FIG. 6 is at a pressure less than atmospheric pressure (negative pressure), a force acts to suck in external air from the boundary where each of the lips 25a are pressed. In this case, the sealing performance may not be sufficient and the external air may be taken into the channel.

For example, on the water suction port S1 side of the pump P shown in FIG. 1, a negative pressure acts to suck up water. Therefore, in a case where a coupling structure similar to the example in FIG. 6 is applied to the coupling of the channel on the water suction port S1 side, air may be taken into the pump P, and the drainage performance may deteriorate.

On the other hand, in the coupling structure shown in FIG. 4 and FIG. 5, the boundary between the first body 10 and the second body 20 is sealed mainly by the contact between the first seal material 15 and the inner circumference 20a. In this structure, good sealing performance is achieved even when water under negative pressure flows into the channels F1 and F2. The coupling structure also exhibits good sealing performance in the case where water of positive pressure flows through it.

The second coupling fitting C2 according to the present embodiment is not only capable of coupling with the first coupling fitting C1 as shown in FIG. 5, but also with other coupling fittings of the same shape as shown in FIG. 6. In other words, in realizing the coupling structure shown in FIG. 5, the first coupling fitting C1 only needs to comprise a sealing structure for negative pressure configured by the first end portion 11 and the first seal material 15, etc. The second coupling fitting C2 does not need any special structure. This increases the versatility of the first coupling fitting C1 and the second coupling fitting C2.

In order to enable the structure as in the second coupling fitting C2 in which a seal material is arranged at the distal end of the second end portion 21 to be used under negative pressure, it is necessary to use a specially shaped seal material for negative pressure. Even if a specially shaped seal material for negative pressure is used, air may be sucked in if a bending force is applied to the connection of the seal material for negative pressure at each coupling fitting. As a countermeasure, it is necessary to arrange special media at points in the channel where bending force may be applied.

In contrast, as shown in FIG. 5, by a structure in which the first end portion 11 of the first body 10 is inserted inside the second body 20, and the first seal material 15 seals between the first end portion 11 and the inner circumference 20a of the second body 20, a gap between the first body 10 and the second body 20 is hardly generated even when bending force is applied.

Coupling fittings having structures such as the first coupling part 1 and the second coupling part 2 are often used in the firefighting field to connect fire hoses. In recent years, floods caused by heavy rains and typhoons have been increasing, and large-diameter hoses and water suction pipes (100 mm, 150 mm, 200 mm, 300 mm) are used for drainage. There is a demand to use coupling fittings with structures such as the first coupling part 1 and the second coupling part 2 for the construction of channels including such large-diameter hoses and water suction pipes. The first coupling fitting C1 and the second coupling fitting C2 according to the present embodiment demonstrate good sealing performance even in the case where the diameter is made as large as these hoses and water suction pipes and negative pressure water flows therein.

Note that, in the present embodiment, the structure of the first coupling fitting C1 is exemplified assuming a case in which the first coupling fitting C1 is a water suction side medium connected to the water suction port S1 of the pump P. The sealing structure for negative pressure provided in the first coupling fitting C1 can be applied to various types of coupling fittings other than the water suction side medium. For example, in the case where another water suction pipe for extension is arranged between the water suction side medium and the water suction pipe T1, a coupling fitting having the sealing structure for negative pressure shown in FIG. 2 may be provided at one end of the water suction pipe that is connected to the second coupling fitting C2 of the water suction pipe T1, and a coupling fitting having the sealing structure for positive pressure shown in FIG. 3 may be provided at the other end.

In the water supply system WS shown in FIG. 1, a coupling fitting with the sealing structure for negative pressure shown in FIG. 2 (first coupling fitting) may be provided in the water suction pipe T1, and a coupling fitting with the sealing structure for positive pressure shown in FIG. 3 may be used as the water suction side medium that is coupled to this coupling fitting.

The first seal material 15 may be in liquid form, such as high viscosity grease. Even when such a liquid first seal material 15 is arranged between the outer circumference 11a and the inner circumference 20a, the boundary between the first body 10 and the second body 20 can be sealed well.

The above embodiment does not limit the scope of the invention to the configuration disclosed in the embodiment. Various other improvements can be applied to the coupling structure and coupling fittings depending on the application.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coupling structure including a first coupling fitting and a second coupling fitting, wherein the first coupling fitting comprises:
a cylindrical first body having a first end portion;
a first coupling part having a plurality of first protrusions arranged around the first end portion, the plurality of first protrusions having hooks defined thereon; and
a first seal material disposed on an outer circumference of the first end portion, wherein the second coupling fitting comprises:

a cylindrical second body having a second end portion and a channel having a diameter larger than an outer diameter of the first end portion of the cylindrical first body;

a second coupling part having a plurality of second protrusions arranged around the second end portion, the plurality of second protrusions having hooks defined thereon; and a second seal material protruding more than a distal end surface of the second end portion in an axial direction of the cylindrical second body, wherein a gap is defined between the outer circumference of the first end portion and the plurality of first protrusions, wherein the gap is greater than a thickness of the second end portion, and wherein, when the first coupling fitting is coupled with the second coupling fitting, the second end portion and the second seal material are configured to be inserted into the gap, the hooks of the plurality of first protrusions and the hooks of the plurality of second protrusions are configured to be engaged, and the first seal material is configured to contact an inner circumference of the cylindrical second body.

2. The coupling structure of claim 1, wherein a diameter of a channel of the cylindrical first body is smaller than a diameter of the channel of the cylindrical second body.

3. The coupling structure of claim 1, wherein the plurality of second protrusions protrude more than the second end portion in the axial direction of the cylindrical second body.

4. The coupling structure of claim 1, wherein the second coupling fitting has no gap defined between an outer circumference of the second end portion and the plurality of second protrusions, or a gap smaller than the gap defined between the outer circumference of the first end portion and the plurality of first protrusions.

5. The coupling structure of claim 1, wherein the second coupling fitting couplable with the first coupling fitting and with one or more other coupling fitting having a same shape as the second coupling fitting other than the first coupling fitting.

6. The coupling structure of claim 1, wherein the cylindrical first body has an annular groove defined on the outer circumference of the first end portion, and the first seal material is a packing fitted into the annular groove.

7. The coupling structure of claim 1, wherein the first end portion protrudes more than the plurality of first protrusions in an axial direction of the cylindrical first body.

8. The coupling structure of claim 1, wherein the first seal material faces the plurality of first protrusions in a radial direction of the cylindrical first body.

9. The coupling structure of claim 1, further comprising a connection port configured to connect the cylindrical first body to a water suction port of a pump.

* * * * *